US 6,480,553 B1

(12) United States Patent
Ho et al.

(10) Patent No.: US 6,480,553 B1
(45) Date of Patent: Nov. 12, 2002

(54) GAUSSIAN FREQUENCY-SHIFT KEYING TRANSCIEVER FOR ISM WIDEBAND COMMUNICATION

(75) Inventors: Hsiang-Te Ho, Ping-Chen (TW); Hsing-Ya Chiang, Hsinchu (TW); Sheau-Chien Wang, Hsinchu Hsien (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

(21) Appl. No.: 09/191,769

(22) Filed: Nov. 13, 1998

(30) Foreign Application Priority Data

Apr. 23, 1998 (TW) ........................................ 87106243 A

(51) Int. Cl.[7] ............................................. H04L 27/10
(52) U.S. Cl. ..................... 375/272; 375/219; 375/303; 375/334; 329/300; 332/100
(58) Field of Search ......................... 340/902; 455/127, 455/73, 83; 370/278, 219, 204, 73, 83; 375/219, 272, 303, 306, 307, 334, 345; 329/300, 302; 331/179; 332/100, 117

(56) References Cited

U.S. PATENT DOCUMENTS

| 4,680,749 A | * | 7/1987 | Englund et al. ............. 370/204 |
| 5,436,589 A | * | 7/1995 | La Rosa et al. ............. 329/302 |
| 5,455,968 A | * | 10/1995 | Pham ........................ 455/127 |
| 5,515,364 A | * | 5/1996 | Fague ........................ 370/278 |
| 5,572,201 A | * | 11/1996 | Graham et al. ............. 340/902 |
| 5,657,344 A | * | 8/1997 | Na ............................ 375/219 |
| 6,366,622 B1 | * | 4/2002 | Brown et al. ............... 375/322 |
| 6,370,361 B1 | * | 4/2002 | Hung et al. .................. 455/83 |

* cited by examiner

Primary Examiner—Stephen Chin
Assistant Examiner—Chieh M. Fan
(74) Attorney, Agent, or Firm—J.C. Patents

(57) ABSTRACT

A GFSK (Gaussian Frequency Shift Keying) radio transceiver is provided for ISM (Industrial Scientific and Medical) wideband communication. The GFSK radio transceiver includes a transmitter for modulating transmitted signal into RF signal, and a receiver for demodulating received signal into digital form. The transmitter includes a VCO for generating an oscillating signal serving as a carrier signal in the transmitter and a first local oscillating signal in the transmitter; and a variable-gain power amplifier, capable of being adjustable between two gain values, for amplifying the RF signal. The receiver includes a mixer for downconverting the received signal into a first IF signal by using the first local oscillating signal from the transmitter; and an IF demodulator for downconverting the first IF signal into a second IF signal by using a locally generated second local oscillating signal. The GFSK radio transceiver can operate either in half-duplex mode or full-duplex mode in a time-division duplex (TDD) system through micro-processor controls. Further, it utilizes a variable-gain power amplifier that can improve the drawbacks of interference and high power consumption with the prior art, and further utilizes a single wideband VCO to generate an oscillating signal that can be used both as the carrier signal in the transmitter and the first local oscillating signal for the receiver. This allows the GFSK radio transceiver to be implemented with a fewer number of VCOs as compared to the prior art, thus reducing the manufacturing cost.

14 Claims, 9 Drawing Sheets

GAUSSIAN FREQUENCY-SHIFT KEYING TRANSCIEVER FOR ISM WIDEBAND COMMUNICATION

CROSS-REFERENCE TO RELATED APPLICATION

This application claims the priority benefit of Taiwan application serial no. 87106243, filed Apr. 23, 1998, the full disclosure of which is incorporated herein by reference.

BACKGROUND OF THE INVENTION

1. Field of the Invention

This invention relates to radio transceivers, and more particularly, to a GFSK (Gaussian Frequency Shift Keying) radio transceiver for ISM (Industrial Scientific and Medical) wideband communication systems.

2. Description of Related Art

A radio transceiver is a communication device that allows the user to talk to another person at a remote side. It is widely used in portable communication devices, such as mobile phones of various standards as CT2, CT3, and various others. Radio transceivers of different standards are distinguished specifically by the particular frequency bands that they use for radio transmissions.

FIG. 1 is a schematic block diagram of a conventional radio transceiver which is specifically designed for radio communication in a particular frequency band, for example the ISM band of 902 MHz to 928 MHz (megahertz).

As shown, the conventional radio transceiver includes mainly a transmitter 10 and a receiver 12. In more detail, the transmitter 10 is composed of a power amplifier (PA) 14, a frequency synthesizer 16, and a Gaussian filter 18; and the receiver 12 is composed of a low-noise amplifier (LNA) 20, a mixer 22, an intermediate-frequency (IF) demodulator 24, and a frequency synthesizer 26. The frequency synthesizer 16 in the transmitter 10 is composed of a phase looked loop (PLL) circuit 28 and a pair of voltage-controlled oscillators (VCO) 30, 32; and the frequency synthesizer 26 in the receiver 12 is composed of a PLL circuit 34 and a VCO 36. Still further, the radio transceiver includes an antenna 42, a band-pass filter (BPF) 40, and a T/R (transmit/receive) switch 38.

The foregoing radio transceiver operates switchably in two modes: transmit mode and receive mode. In the transmit mode, the T/R switch 38 connects the antenna 42 and the BPF 40 to the transmitter 10. The data signal to be transmitted is first processed by the Gaussian filter 18. Then, the output of the Gaussian filter 18 is transferred to the frequency synthesizer 16 where the data signal is modulated by an RF (radio frequency) carrier signal generated by the VCO 30 in the frequency synthesizer 16. The modulated RF signal is then amplified by the PA 14. The amplified signal from the PA 14 is then transferred via the T/R switch 38 (which is now switched to the transmitter 10) and subsequently via the BPF 40 to the antenna 42 for transmission through the either to the receiving side.

In the receive mode, The other VCO 32 is used to generate a local oscillating signal LO1 for use in the receiver 12 to downconvert the received signal. The RF signal received by the antenna 42 first passes through the BPF 40 and subsequently through the T/R switch 38 (which is now switched to the receiver 12) to the receiver 12. In the receiver 12, the received RF signal is first amplified by the LNA 20. The amplified RF signal from the LNA 20 is then mixed by the mixer 22 with the first oscillating signal LO1 from the VCO 32 so as to downconvert it to a first intermediate-frequency (IF) signal. The first IF signal from the mixer 22 is further mixed by the IF demodulator 24 with the second local oscillating signal LO2 from the VCO 36 in the frequency synthesizer 26 so as to further downconvert the first IF signal to a second IF signal with an even lower frequency. After this, the original data form of the received signal can be extracted from the second IF signal through a quadrature detection means in the IF demodulator 24.

One drawback to the foregoing radio transceiver, however, is that it requires the use of two frequency synthesizers, i.e., 16 and 26, which makes both the design and the manufacture of the radio transceiver more complex to carry out. The manufacturing cost is therefore considerably high. A conventional solution to this problem is to combine the two frequency synthesizers into one single unit. However, this solution requires the use of a wideband VCO, a fast switching time, and a large frequency shift in data switching, which would make the radio transceiver very difficult to realize. Moreover, since the PA 14 is a one-stage amplifier with a fixed gain, it can cause interference to other nearby radio transceivers and high power consumption to the radio transceiver itself, leading to a poor signal quality in transmitting and reception and a reduced number of radio transceivers that can be used at the same time and the same site.

As a summary, the prior art has the following drawbacks.

(1) First, it requires the use of two frequency synthesizers to implement, which makes both the design and the manufacture of the radio transceiver more complex to carry out.

(2) Second, the scheme of combining two frequency synthesizers into one single unit requires the use of a wideband VCO, a fast switching time, and a large frequency shift in data switching, which would make the radio transceiver very difficult to realize.

(3) Third, the power amplifier used in the prior art is a one-stage amplifier with a fixed gain, which would cause interference to other nearby radio transceivers and high power consumption to the radio transceiver itself, leading to a poor signal quality in transmitting and reception and also a reduced number of radio transceivers that can be used at the same time and the same site.

SUMMARY OF THE INVENTION

It is therefore an objective of the present invention to provide a GFSK radio transceiver for ISM wideband communication, which can be used in conjunction with a time-division duplex (TDD) system and operate selectively in either half-duplex mode or full-duplex mode.

It is another objective of the present invention to provide a GFSK radio transceiver for ISM wideband communication, which utilizes a variable-gain power amplifier that can help improve the problems of interference and high power consumption that are drawbacks with the prior art.

It is still another objective of the present invention to provide a GFSK radio transceiver for ISM wideband communication, which utilizes only one single wideband VCO to generate an oscillating signal that can be used both as the carrier signal in the transmitter and as a local oscillating signal in the receiver, thus allowing the GFSK radio transceiver of the invention to be implemented with a fewer number of VCOs as compared to the prior art so that the manufacturing cost of the GFSK radio transceiver of the invention can be reduced.

In accordance with the foregoing and other objectives of the present invention, a new GFSK radio transceiver is provided for ISM wideband communication. The GFSK radio transceiver of the invention comprises a transmitter and a receiver.

The transmitter used for modulating transmitted signal into RF signal comprises a VCO and a variable-gain power amplifier. The VCO is used for generating an oscillating signal serving as a carrier signal for the transmitted signal. The variable-gain power amplifier, which is capable of being adjustable between a low-power gain and a high-power gain, is used for amplifying the RF signal.

The receiver, which is used for demodulating received signal into digital form, comprises a mixer, a local oscillator and an IF demodulator. The mixer is used for downconverting the received signal into a first IF signal by mixing the received signal with a first local oscillating signal which is fetched from the oscillating signal from the VCO in the transmitter. The local oscillator is used for generating a second local oscillating signal. The IF demodulator is used for downconverting the first IF signal from the mixer into a second IF signal by mixing the first IF signal with the second local oscillating signal.

Compared to the prior art, the GFSK radio transceiver of the invention can operate either in half-duplex mode or in full-duplex mode in a TDD system through micro-processor controls. Further, the GFSK radio transceiver of invention utilizes a variable-gain power amplifier that can improve the problems of interference and high power consumption that are drawbacks with the prior art. Moreover, the GFSK radio transceiver of the invention utilizes one single wideband VCO to generate an oscillating signal that can be used both as the carrier signal in the transmitter and as a first local oscillating signal in the receiver. This feature allows the GFSK radio transceiver of the invention to be implemented with a fewer number of VCOs as compared to the prior art, thus reducing the manufacturing cost.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The invention provides a GFSK (Gaussian Frequency Shift Keying) radio transceiver for use in a TDD (time-division duplex) system for ISM (Industrial Scientific and Medical) wideband communication in the band of from 902 MHz to 928 MHz. The GFSK radio transceiver of the invention can operate either in full-duplex or half-duplex mode.

Figure 1:
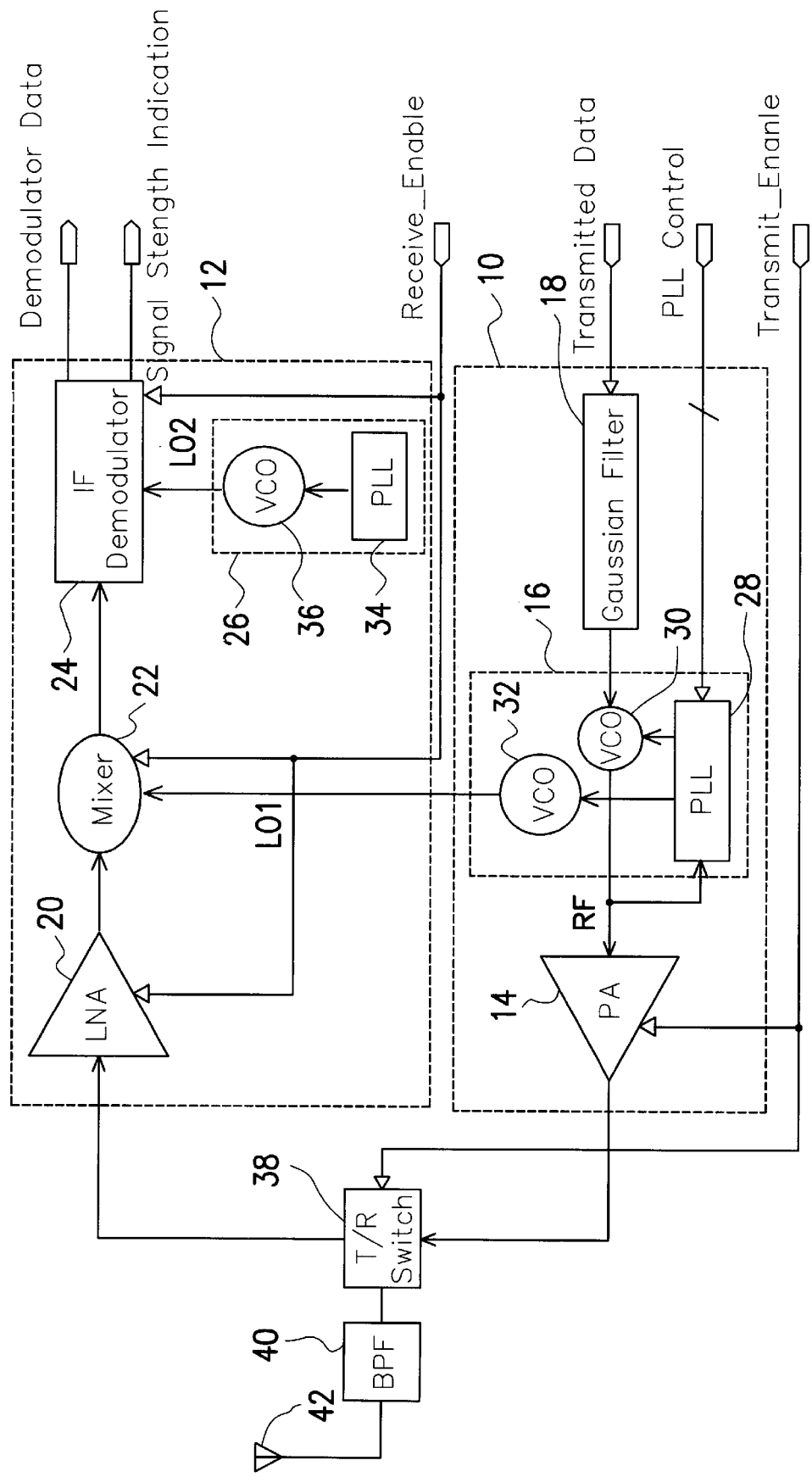
FIG. 1 is a schematic block diagram of a conventional radio transceiver.
Figure 2:
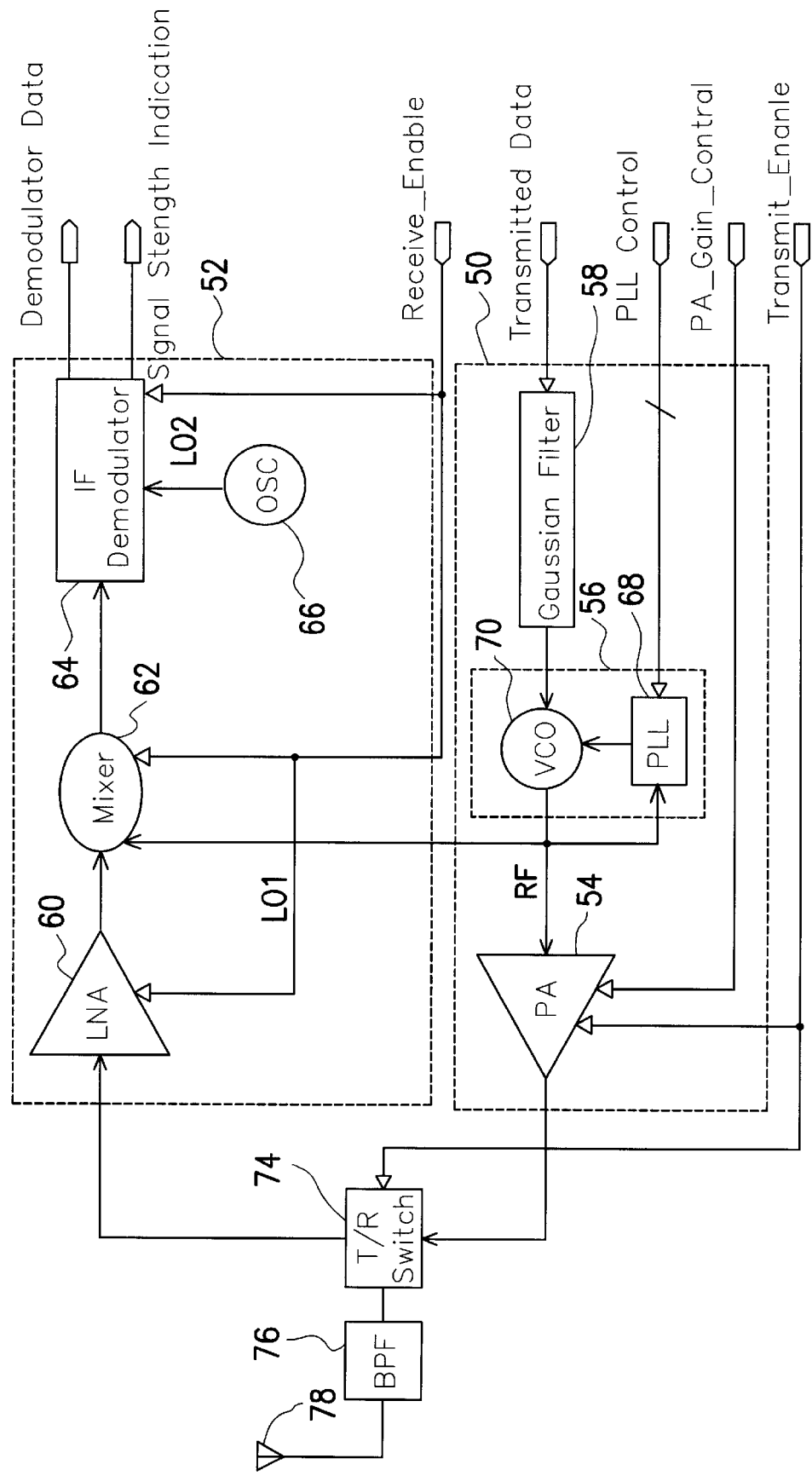
FIG. 2 is schematic block diagrams of the GFSK radio transceivers according to the invention.

FIG. 2 is a schematic block diagram of the GFSK radio transceiver according to the invention.

As shown, the GFSK radio transceiver of the invention includes mainly a direct modulation transmitter 50 and a double intermediate-frequency (IF) receiver 52. The transmitter 50 and the receiver 52 are switchably connected via a T/R (transmit/receive) switch 74 to a band-pass filter (BPF) 76 and an antenna 78. The BPF 76 is designed to filter out undesired frequencies outside a designed band from either the transmitted RF signal or the received RF signal.

The transmitter 50 is composed of a variable-gain power amplifier 54 whose gain is variably adjustable between two values, a frequency synthesizer 56 including a phase-locked loop (PLL) circuit 68 and a voltage-controlled oscillator (VCO) 70, and a Gaussian filter 58. The receiver 52 is composed of a low-noise amplifier (LNA) 60, a mixer 62, an IF demodulator 64, and a local oscillator (OSC) 66 such as a crystal oscillator. It is one characteristic part of the invention that the power amplifier 54 is variably adjustable between a high-power gain and a low-power gain.

When operating within small ranges, the power amplifier 54 can be set to the low-power gain to allow low power consumption and low interference, thus allowing an increased number of radio transceivers to be used at the same time and the same site. The invention therefore represents an improvement to the problems of interference and high power consumption that are drawbacks with the prior art. Moreover, the invention can allow the analog output from the IF demodulator 64 to be processed through a DC detection circuit in either the full-duplex mode or the half-duplex mode so as to demodulate for the original digital data.

Figure 3:
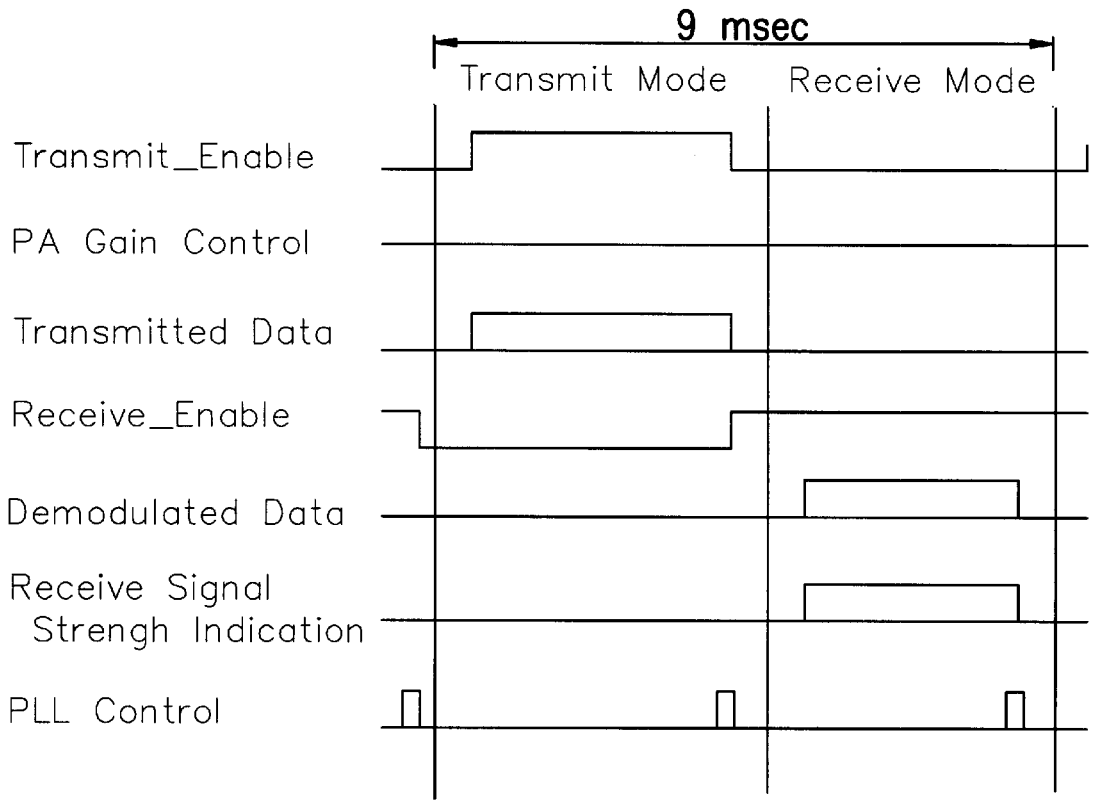
FIG. 3 is a waveform diagram showing the waveforms and timings of various signals in the GFSK radio transceiver of the invention.

FIG. 3 is a waveform diagram showing the waveforms and timings of the various control signals used in the GFSK radio transceiver of FIG. 2 when operating in full-duplex mode for achieving the TDD operation. In half-duplex mode, the GFSK radio transceiver can operate only in either the transmit mode or the receive mode at a time.

Figure 4:
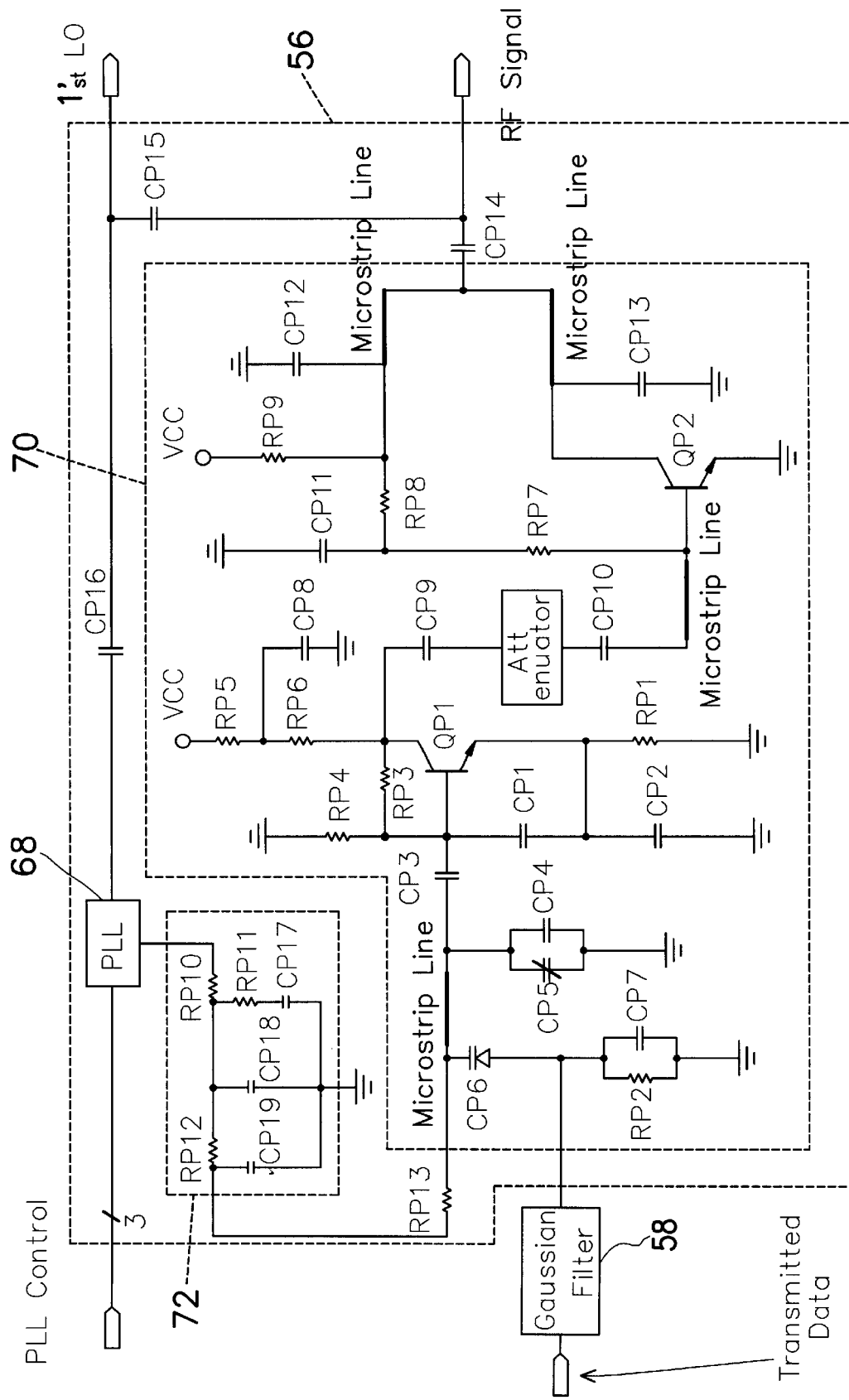
FIG. 4 is a circuit diagram showing detailed inside structure of a frequency synthesizer utilized in the GFSK radio transceiver of the invention.

FIG. 4 is a circuit diagram showing the detailed inside structure of the frequency synthesizer 56 utilized in the transmitter 50 of the GFSK radio transceiver of FIG. 2. As shown. the VCO 70 includes an oscillation-stage circuit with a transistor QP1 and a buffer-stage circuit with a transistor QP2 to generate the RF signal. The output RF signal is fed back through a capacitor CP16 to the PLL circuit 68. The PLL circuit 68 is capable of locking the transmitted signal at a predetermined frequency. The output of the PLL circuit 68 is then filtered by a filtering circuit 72, and the output of the filtering circuit 72 is then used to control a varactor CP6 to generate an oscillating frequency. The filtering circuit 72 is composed of a plurality of resistors RP10, RP11, RP12 and a plurality of capacitors CP17, CP18, CP19.

Referring to FIG. 2 together with FIG. 4, when the GFSK radio transceiver operates in the transmit mode, the data signal that is to be transmitted out is first transferred to the Gaussian filter 58. The output of the Gaussian filter 58 is then transferred to the anode of the varactor CP6 in the frequency synthesizer 56. The output of the varactor CP6 is then modulated by the carrier signal generated by the oscillation-stage transistor QP1. The modulated signal then passes through the buffer-stage transistor QP2 to produce the RF signal. It is another characteristic part of the invention that the output oscillating frequency from the VCO 70 is used both by the frequency synthesizer 56 for modulating the data signal into the RF signal and by the mixer 62 in the receiver 52 as a first local oscillating signal LO1 to down-convert the received signal. The VCO 70 is designed to operate in a wideband of more than 200 MHz. When the radio transceiver is witched to the receive mode, the receiver 52 can immediately use the first local oscilating signal LO1 for demodulation of the received signal. The output RF signal from the frequency synthesizer 56 is then amplified by the power amplifier 54 and then transferred via the T/R switch 74 and the BPF 76 to the antenna 78 for transmission through the ether to another transceiver on the remote side.

Figure 5:
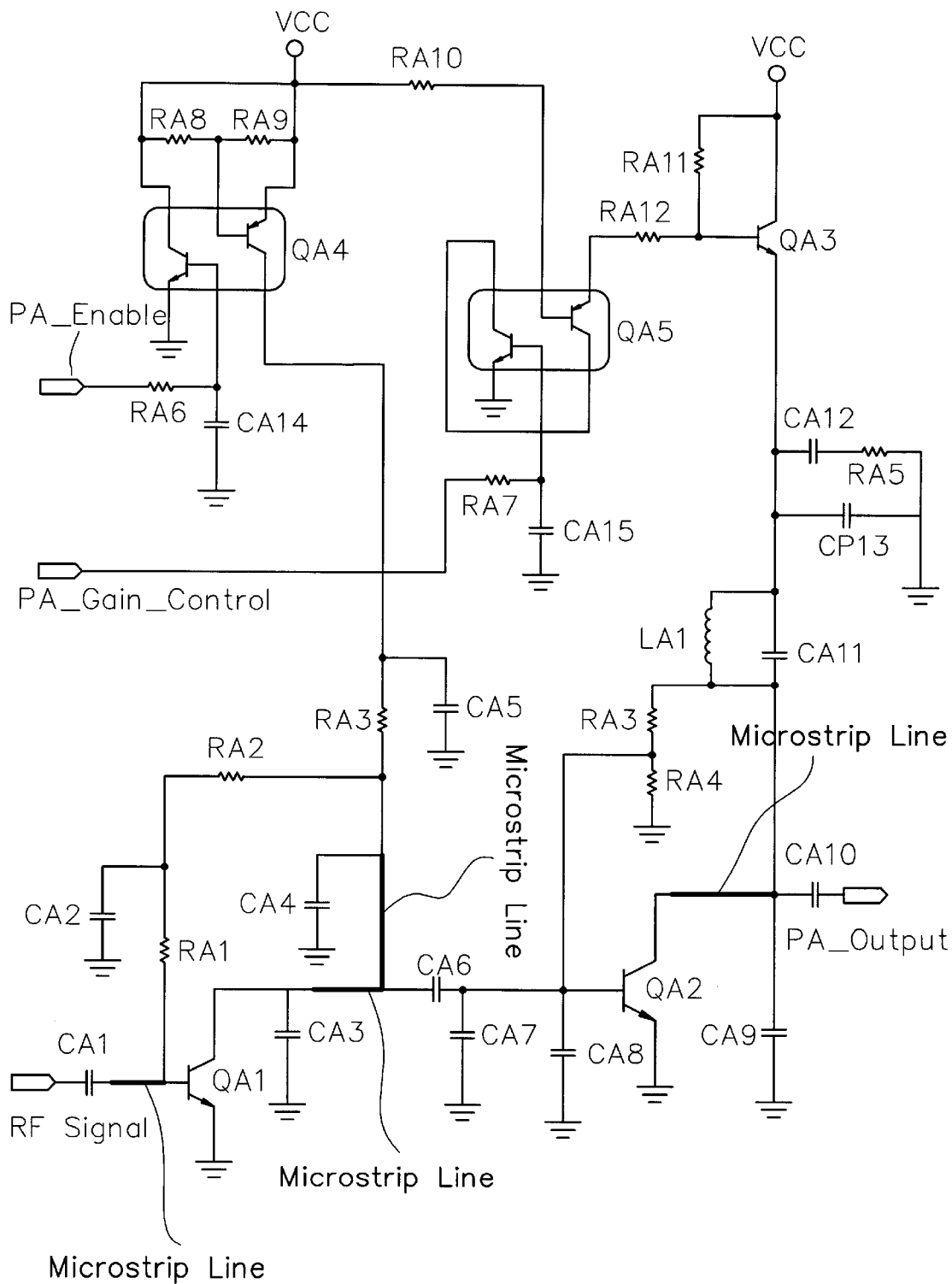
FIG. 5 is a circuit diagram showing detailed inside structure of a variable-gain power amplifier utilized in the GFSK radio transceiver of the invention.

FIG. 5 is a circuit diagram showing detailed inside structure of the variable-gain power amplifier 54 utilized in the transmitter 50 of the GFSK radio transceiver of the invention. The power amplifier 54 is designed to be adjustable in gain between two predetermined values: a high-power gain and a low-power gain. As shown, the power amplifier 54 includes two amplifying transistors QA1, QA2, and two switching transistors QA4, QA5. The ON/OFF state of the first switching transistor QA4 is controlled by a PA_Enable signal, while the ON/OFF state of the second switching transistor QA5 is controlled by a PA_Gain_Control signal.

When it is desired to operate the power amplifier 54 in the low-power gain mode, the PA_Enable signal is, for example, switched to high-voltage logic state (HIGH) while the PA_Gain_Control signal is switched to low-voltage logic state (LOW), thereby causing the first switching transistor QA4 to be switched ON and the second switching transistor QA5 to be switched OFF. As a result, the first amplifying transistor QA1 is put into active operation, while the second amplifying transistor QA2 is idled. The overall amplification gain of the power amplifier 54 is therefore contributed solely by the first amplifying transistor QA1, resulting in a low-power gain to the RF signal.

On the other hand, when it is desired to operate the power amplifier 54 in the high-power gain mode, the PA_Enable signal is switched to high-voltage logic state (HIGH) while the PA_Gain_Control signal is also switched to high-voltage logic state (HIGH), thereby causing both the first and second switching transistors QA4, QA5 to be switched ON. As a result, both the first and second amplifying transistors QA1, QA2 are put into active operation. The overall amplification gain of the power amplifier 54 is therefore contributed by both the first and second amplifying transistors QA1, QA2, resulting in a high-power gain to the RF signal. Therefore, the two distinctive gain values of the power amplifier 54 can be varied simply by switching the PA_Gain_Control signal to different logic values. Moreover, the power amplifier 54 can operate under a continuous-wave mode, allowing the power amplifier 54 to be operable in either the full-duplex mode or the half-duplex mode.

Figure 6:
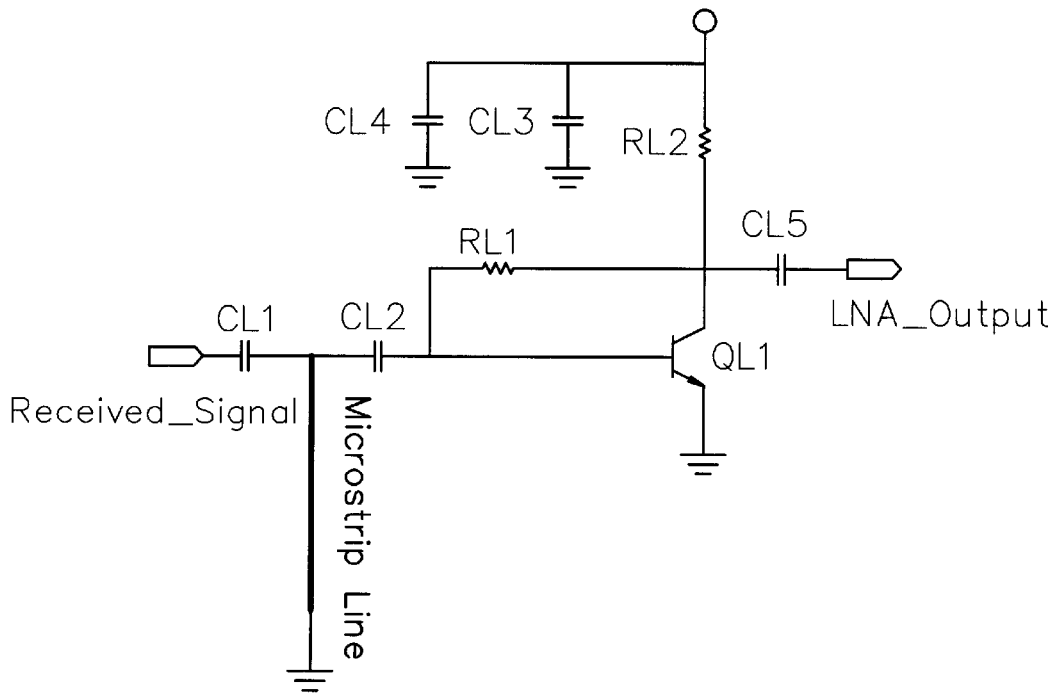
FIG. 6 is a circuit diagram showing detailed inside structure of a low-noise amplifier utilized in the GFSK radio transceiver of the invention.

FIG. 6 is a circuit diagram showing detailed inside structure of the LNA 60 utilized in the receiver 52 of the GFSK radio transceiver of the invention. As shown, the LNA 60 includes only one amplifying transistor QL1 with a noise figure below 2.5 dB for one-stage amplification of the received signal.

Figure 7A:
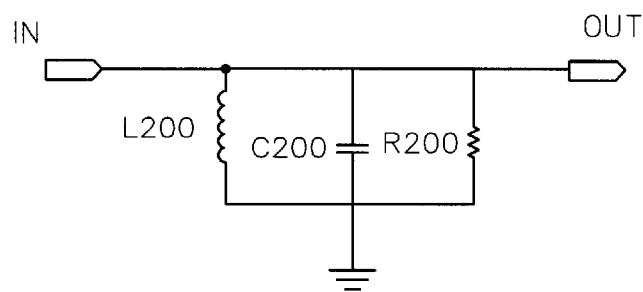
FIG. 7A is a circuit diagram of an LC filter utilized in the GFSK radio transceiver of the invention.
Figure 7B:
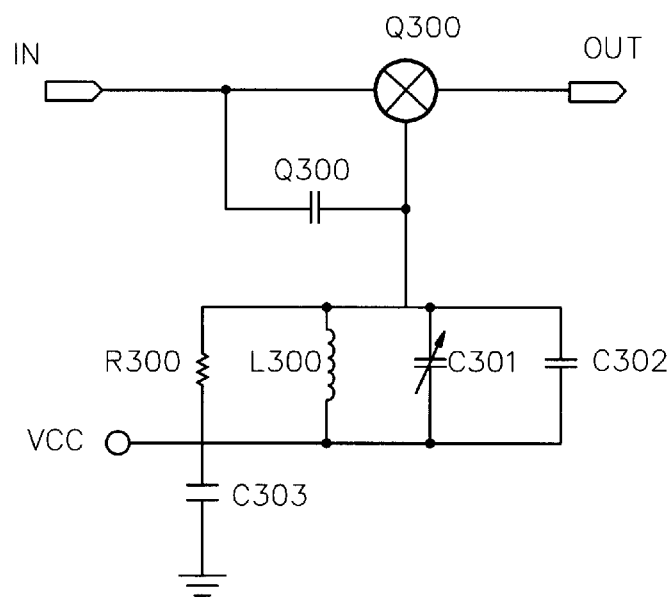
FIG. 7B is a circuit diagram of a quadrature discriminator utilized in the GFSK radio transceiver of the invention.
Figure 8:
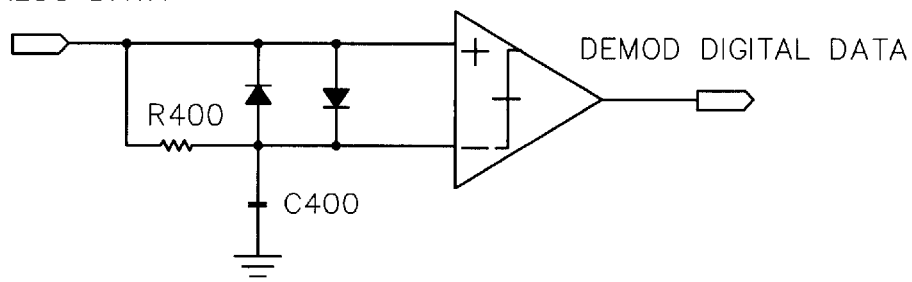
FIG. 8 is a circuit diagram of a DC detection circuit utilized in the GFSK radio transceiver of the invention.

In this GFSK radio transceiver, the IF is set at 110.592 MHz. Therefore, the OSC 66 can be a 40.0 MHz crystal oscillator, and the third harmonic 120.0 MHz therefrom is utilized to serve as the second local oscillating signal LO2. When the received signal is downconverted to the second IF signal of 9.4 MHz, the LC filter as shown in FIG. 7A can be used for the filtering of the 9.4 MHz IF signal. Subsequently, the orthogonal frequency discriminator as shown in FIG. 7B can be used to demodulate the 9.4 MHz IF signal to obtain the original analog data (DEMOD ANALOG DATA). After this, the DC detection circuit as shown in FIG. 8 can be used to demodulate the analog data from the discriminator into digital form (DEMOD DIGITAL DATA). In the DC detection circuit of FIG. 8, the output characteristic is dependent on the RC value (time constant) that is set by the resistor R400 and the capacitor C400.

Figure 9A:
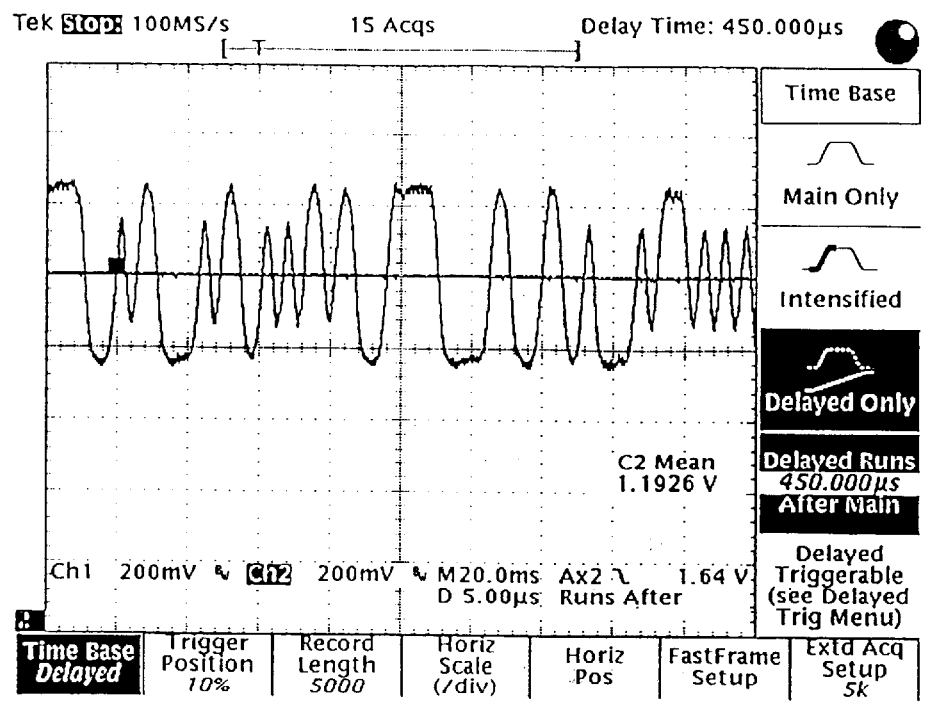
FIGS. 9A–9E are graphs showing the output characteristics of the DC detection circuit of FIG. 8 for various time constant values.
Figure 9B:
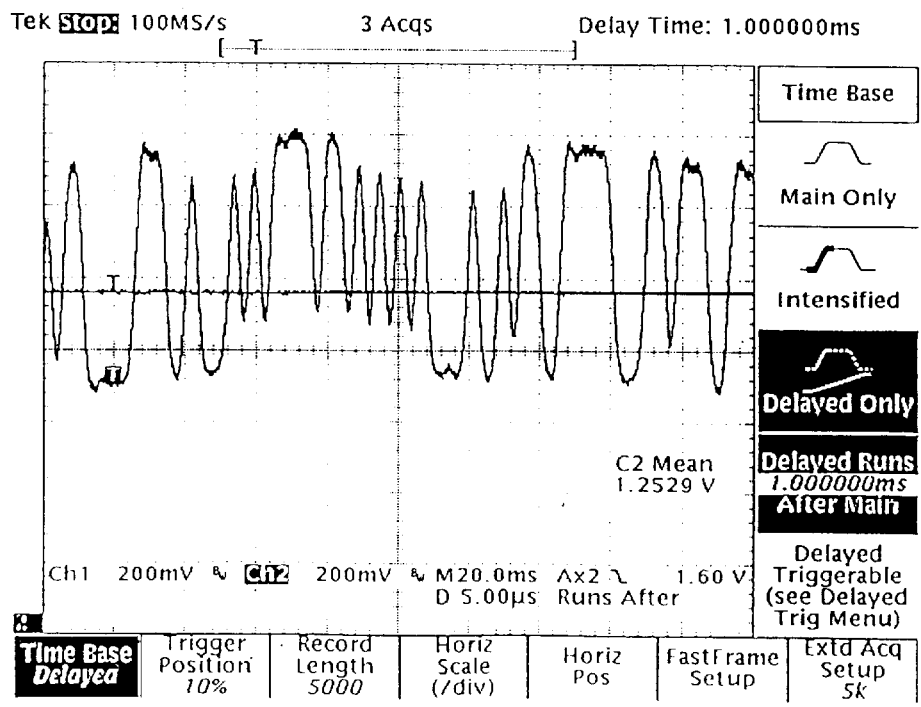
Figure 9C:
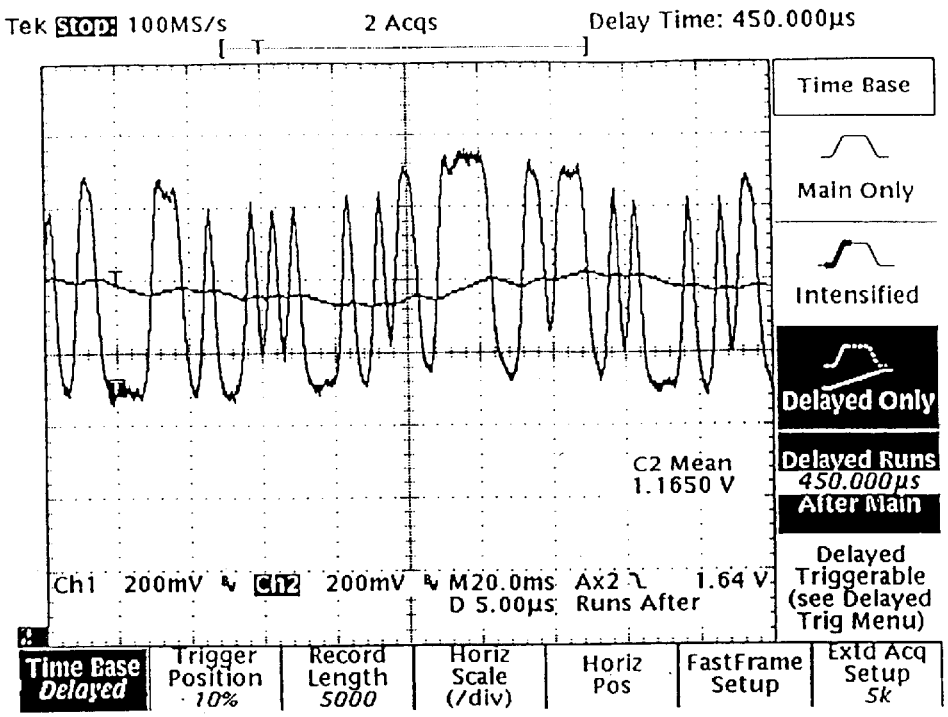
Figure 9D:
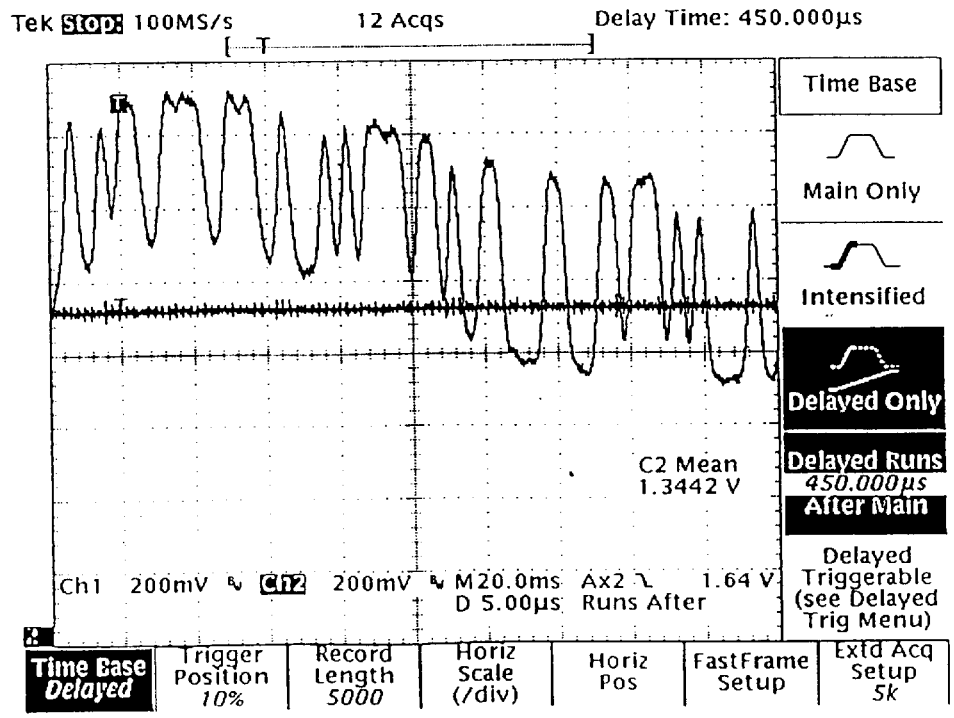
Figure 9E:
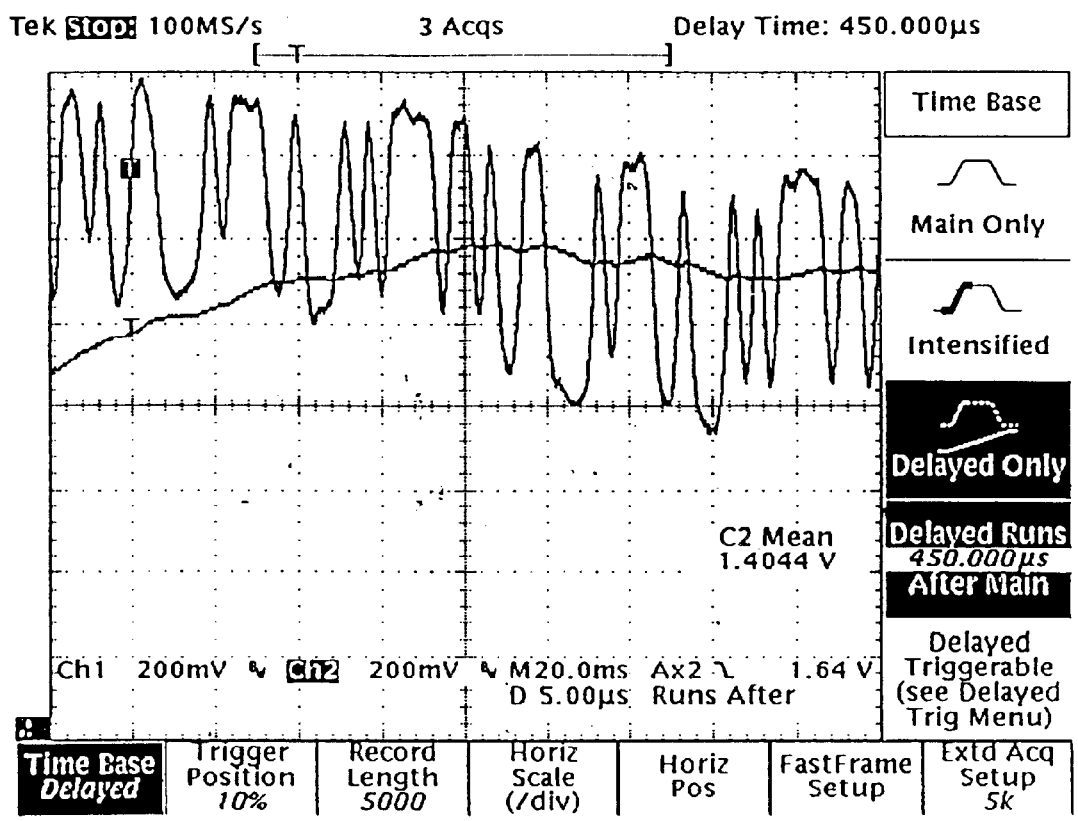

FIGS. 9A–9E are graphs showing the output characteristics of the DC detection circuit of FIG. 8 for various RC values; wherein FIGS. 9A–9C show the results when the radio transceiver operates in the half-duplex mode, while FIGS. 9D–9E show the results when the radio transceiver operates in the full-duplex mode.

When operating in the half-duplex mode, if the received signal is stable, then a large RC value will allow the DC detection circuit to generate a stable DC output as shown in FIG. 9A. If the received signal is unstable, however, a large RC value will not allow the optimal DC threshold to the DC detection circuit, as shown in FIG. 9B. In this case, reducing the RC value will allow an improvement to the DC threshold, as shown in FIG. 9C.

When operating in the full-duplex mode, since there will be transit switching in this mode, different RC values will lead to different results, as respectively shown in FIG. 9D and FIG. 9E. It can be learned from the graphs of FIG. 9D and FIG. 9E that a smaller RC value will allow the DC detection circuit to detect the DC voltage more fast in speed. Moreover, since the GFSK radio transceiver is designed for use in a wideband communication system, the DC detection circuit can be used both in the half-duplex mode and in the half-duplex mode to find the optimal RC value. For example, if the bit rate is 1.365 Mbps (mega bits per second), the RC value of the DC detection circuit can be such that R400=15 kΩ, C400=15 nF (nanofarad).

When the GFSK radio transceiver operates in the receive mode, the received signal from the antenna 78 first passes through the BPF 76 and subsequently through the T/R switch 74 to the LNA 60 where the received signal is amplified. The amplified signal from the LNA 60 is then downconverted in frequency by the mixer 62, which mixes the received signal with the first local oscillating signal LO1 from the VCO 70, to thereby convert the received signal into the first IF signal. The first IF signal from the mixer 62 is further downconverted in frequency by the IF demodulator 64, which mixes the first IF signal with the second local oscillating signal LO2 from the OSC 66, to thereby produce the second IF signal with an even lower frequency. From the second IF signal, conventional methods, such as frequency discrimination, DC detection, and comparator means, can be used to obtain the original form of the digital data that was transmitted out from the transceiver on the remote side.

In conclusion, the GFSK radio transceiver of the invention for ISM wideband communication has the following advantages over the prior art.

(1) First, the GFSK radio transceiver of the invention can operate either in half-duplex mode or in full-duplex mode in a TDD system through micro-processor controls.

(2) Second, the GFSK radio transceiver of invention utilizes a variable-gain power amplifier that can improve the problems of interference and high power consumption that are drawbacks with the prior art.

(3) Third, the GFSK radio transceiver of the invention utilizes one single wideband VCO to generate an oscillating signal that can be used both as the carrier signal in the transmitter and as a local oscillating signal in the receiver. This feature allows the GFSK radio transceiver of the invention to be implemented with a fewer number of VCOs as compared to the prior art, thus reducing the manufacturing cost.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A GFSK radio transceiver for ISM wideband communication, which comprises:
   a transmitter for modulating a data signal into a GFSK RF signal, the transmitter including:
      a Gaussian filter;
      a VCO for generating an oscillating signal serving as a carrier signal for the transmitted signal, wherein the VCO further includes an oscillation-stage circuit for generating an oscillating signal serving as the carrier signal to modulate the transmitted signal into RF signal; and a buffer-stage circuit, coupled to the oscillation stage circuit, for buffering the REF signal; and
      a variable-gain power amplifier, which is capable of being adjustable between a low-power gain and a high-power gain, for amplifying the RF signal; and
   a receiver for demodulating received signal into digital form, the receiver including:
      a mixer for downconverting the received signal into a first IF signal by mixing the received signal with a first local oscillating signal which is fetched from the oscillating signal from the VCO in the transmitter;
      a local oscillator for generating a second local oscillating signal; an IF demodulator for downconverting the first IF signal from the mixer into a second IF signal by mixing the first IF signal with the second local oscillating signal;
      a micro-processor for selecting transceiver operation in half-duplex or full-duplex mode.

2. The GFSK radio transceiver of claim 1, wherein the transmitter further includes:
   a PLL circuit, coupled to the VCO, for locking the transmitted signal at a predetermined frequency.

3. The GFSK radio transceiver of claim 1, wherein the receiver further includes:
   an LNA for amplifying received signal prior to being processed by the mixer.

4. The GFSK radio transceiver of claim 1, further comprising:
   an antenna switchably connected to either the transmitter or the receiver, the antenna being connected to the transmitter when the GFSK radio transceiver operates in transmit mode and to the receiver when the GFSK radio transceiver operates in receive mode.

5. The GFSK radio transceiver of claim 4, further comprising:
   a BPF, coupled to the antenna, for filtering out undesired frequencies outside a designed band from either the transmitted RF signal or the received RF signal.

6. The GFSK radio transceiver of claim 5, further comprising:
   a T/R switch for switchably connecting the output of the transmitter to the BPF or the input of the receiver to the BFP, the T/R switch connecting the BPF to the output of the transmitter when the GFSK radio transceiver operates in transmit mode and to the input of the receiver when the GFSK radio transceiver operates in receive mode.

7. The GFSK radio transceiver of claim 1, wherein the VCO has a wideband output characteristic with a range of output frequencies more than 200 MHz.

8. The GFSK radio transceiver of claim 1, wherein the local oscillator in the receiver is a quartz oscillator.

9. A GFSK radio transceiver for ISM wideband communication, which comprises:
   a transmitter for modulating transmitted digital signal into RP signal, the transmitter including:
      a Gaussian filter for filtering in the transmitted digital signal;
      a VCO, receiving the output of the Gaussian filter as input, for generating an oscillating signal serving as carrier signal for the transmitted signal, wherein the VCO includes an oscillation-stage circuit for generating an oscillating signal serving as the carrier signal to modulate the transmitted signal into RF signal; and a buffer-stage circuit, coupled to the oscillation-stage circuit, for buffering the RF signal;
      a PLL circuit, coupled to the VCO, for locking the transmitted signal at a predetermined frequency; and
      a variable-gain power amplifier, which is capable of being adjustable between a low-power gain and a high-power gain, for amplifying the RF signal; and
   a receiver for demodulating received signal into digital form, the receiver including:
      an LNA for amplifying received signal prior to being processed by the mixer;
      a mixer for downconverting received signal into a first IF signal by mixing received signal with a first local oscillating signal which is fetched from the oscillating signal from the VCO in the transmitter;
      a local oscillator for generating a second local oscillating signal; and
      an IF demodulator for downconverting the first IF signal from the mixer into a second IF signal by mixing the first IF signal with the second local oscillating signal.

10. The GFSK radio transceiver of claim 9, further comprising:
    an antenna switchably connected to either the transmitter or the receiver, the antenna being connected to the transmitter when the GFSK radio transceiver operates in transmit mode and to the receiver when the GFSK radio transceiver operates in receive mode.

11. The GFSK radio transceiver of claim 9 further comprising:
    a BPF, coupled to the antenna, for filtering out undesired frequencies outside a designed band from either the transmitted RF signal or the received RF signal.

12. The GFSK radio transceiver of claim 9, further comprising:

a T/R switch for switchably connecting the output of the transmitter to the BPF or the input of the receiver to the BFP, the T/R switch connecting the BPF to the output of the transmitter when the GFSK radio transceiver operates in transmit mode and to the input of the receiver when the GFSK radio transceiver operates in receive mode.

13. The GFSK radio transceiver of claim 9, wherein the VCO has a wideband output characteristic with a range of output frequencies more than 200 MHz.

14. The GFSK radio transceiver of claim 9, wherein the local oscillator in the receiver is a crystal oscillator.

* * * * *